United States Patent
Fang et al.

(10) Patent No.: US 7,240,562 B2
(45) Date of Patent: Jul. 10, 2007

(54) METHOD FOR MODELING MATERIAL CONSTITUTIVE BEHAVIOR

(75) Inventors: Ning Fang, Logan, UT (US); Thomas H. Fronk, Providence, UT (US)

(73) Assignee: Utah State University, Logan, UT (US)

( * ) Notice: Subject to any disclaimer, the term of this patent is extended or adjusted under 35 U.S.C. 154(b) by 108 days.

(21) Appl. No.: 11/130,851

(22) Filed: May 17, 2005

(65) Prior Publication Data

US 2005/0267623 A1  Dec. 1, 2005

Related U.S. Application Data

(60) Provisional application No. 60/574,090, filed on May 25, 2004.

(51) Int. Cl.
*G01D 1/16* (2006.01)

(52) U.S. Cl. .............................. 73/789; 73/9
(58) Field of Classification Search ............. 73/9, 73/789
See application file for complete search history.

(56) References Cited

U.S. PATENT DOCUMENTS

| 5,651,648 | A * | 7/1997 | Furey et al. ................. 409/131 |
| 6,368,030 | B1 * | 4/2002 | Sato et al. .................... 407/53 |
| 6,706,324 | B2 * | 3/2004 | Chandrasekar et al. 427/255.11 |
| 7,104,868 | B2 * | 9/2006 | Suzuki ......................... 451/28 |
| 2002/0150496 | A1 * | 10/2002 | Chandrasekar et al. ....... 419/33 |
| 2006/0251480 | A1 * | 11/2006 | Mann et al. ................. 408/1 R |

* cited by examiner

*Primary Examiner*—Edward Lefkowitz
*Assistant Examiner*—Freddie Kirkland, III
(74) *Attorney, Agent, or Firm*—John R. Thompson; Stoel Rivers LLP (57) ABSTRACT

In modeling material constitutive behavior, a methodology determines tool-chip friction and a position of a stagnation point on a cutting tool. The methodology includes measuring a ratio of cutting force to thrust force and measuring a chip thickness, $h_{ch}$, produced by applying the cutting tool to a material. Initial values are estimated for tool chip friction and position of stagnation. The tool chip friction and position of stagnation are calculated to satisfy a specified relationship. Based on tool chip friction and position of stagnation, material strains, material strain-rates, material temperatures, and material stresses are calculated.

49 Claims, 3 Drawing Sheets

METHOD FOR MODELING MATERIAL CONSTITUTIVE BEHAVIOR

RELATED APPLICATIONS

This application claims priority to U.S. patent application Ser. No. 60/574,090 filed on May 25, 2004, entitled "Method for Modeling Material Constitutive Behavior," and is incorporated herein by reference.

TECHNICAL FIELD

The present invention relates to material modeling to determine strains, strain-rates, and temperatures.

BACKGROUND OF THE INVENTION

Modeling of material constitutive behavior in a variety of applications is important. The conventional tension or compression tests are only applicable under low strain-rates ($10^{-3}$-$10^{-1}$/s) and low temperatures. The accuracy of this method strongly depends on the models of chip formation and tool-chip friction. In the machining processes, chip deformation, material constitutive relationships, and tool-chip friction are coupled together and affect each other. In most of analytical models of chip formation, it is customary to calculate the strain-rate in the primary shear zone by assuming the thickness $\Delta S$ of this zone to be one-tenth of the undeformed chip thickness. $\Delta S$ and strain-rates also highly depend on the tool edge roundness, i.e., the tool edge radius, the position of stagnation point on the rounded cutting edge, and tool-chip friction. The effect of tool edge roundness is neglected in the parallel-sided shear zone model.

Thus, it would be an advancement in the art to provide a new slip-line model of chip formation for machining, taking into account the effects of tool edge roundness on $\Delta S$ and strain-rates. Discussed herein is a methodology for modeling material constitutive behavior at large strains, high strain-rates, and elevated temperatures through an orthogonal machining test.

SUMMARY

A system and methodology provides modeling of material constitutive behavior at large strains, high strain-rates, and elevated temperatures through an orthogonal machining test. The methodology is based on a slip-line model of chip formation proposed for machining with a rounded edge tool. The model predicts strains, strain-rates and temperatures in the primary shear zone. Tool-chip friction and the position of stagnation point on the rounded cutting edge are determined by using a reverse method, i.e., by matching the predicted and experimental force ratio and chip thickness. Extensive cutting tests involving 6061-T6, 2024-T351, and 7075-T6 aluminum alloys over a wide range of cutting conditions confirm the effectiveness of the proposed methodology.

Additional aspects will be apparent from the following detailed description of preferred embodiments, which proceeds with reference to the accompanying drawings.

BRIEF DESCRIPTION OF THE DRAWINGS

Various embodiments of the invention are now described with reference to the figures, in which.

DETAILED DESCRIPTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 4, is not intended to limit the scope of the invention, as claimed, but is merely representative of presently preferred embodiments of the invention.

Figure 1:
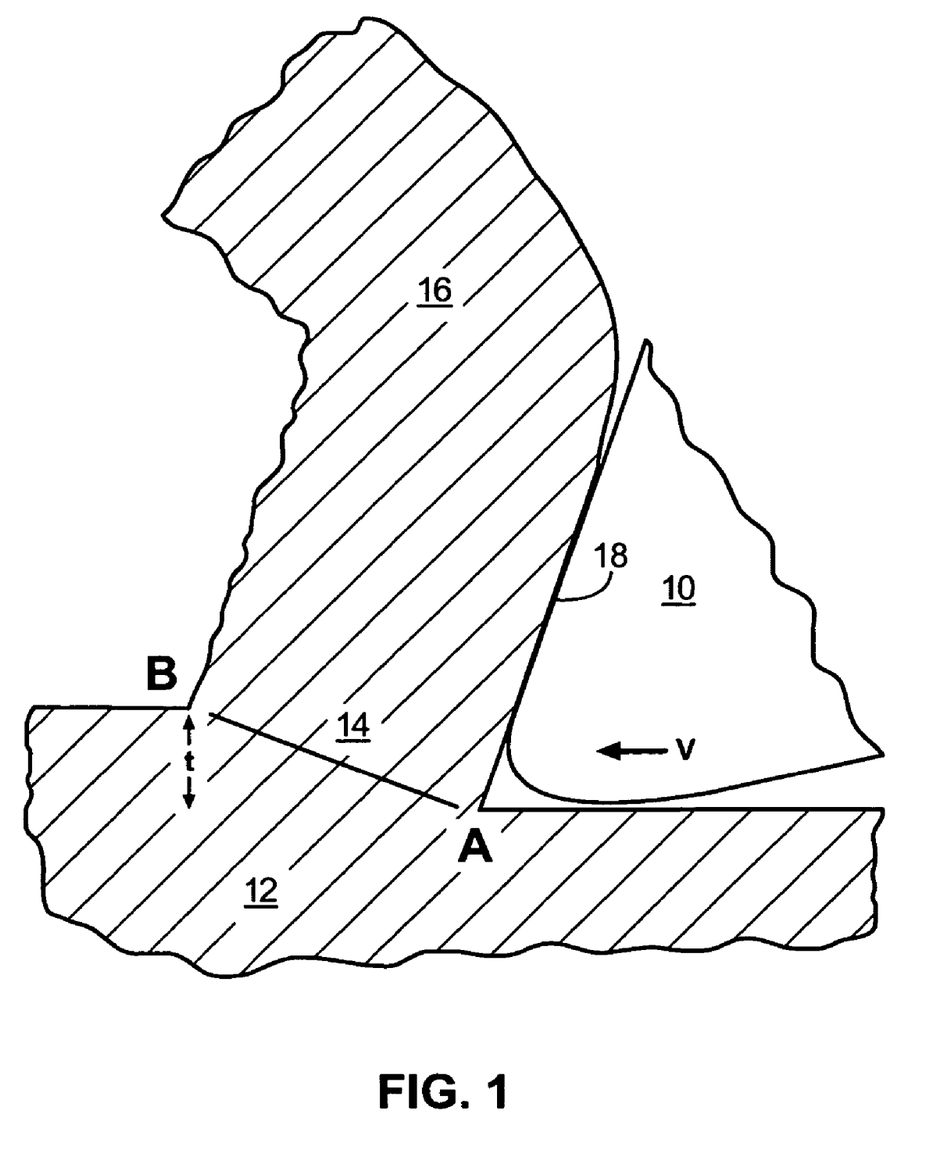
FIG. 1 is a cross-sectional view of a tool cutting a workpiece.

Referring to FIG. 1, a cross-sectional diagram of a tool 10 engaging a workpiece 12 in a cutting process. The workpiece 12 is cut at a depth t and a cutting speed v. Cutting speed refers to the speed at which the tool 10 moves with respect to the workpiece 12. Feed rate is the rate at which the workpiece 12 moves into the tool 10. Cutting speed and feed rate affect the time to finish a cut, tool life, finish of the machined surface, and power required of a cutting machine. Cutting speed may be determined by the material to be cut and the material of the tool. Feed rate may depend on several variables including width and depth of the cut and desired finish. The material layer 14 at the top is formed into a chip 16 by a shearing process in a primary shear zone at AB. The chip 16 slides up a rake face 18 and undergoes some plastic flow due to frictional force.

Figure 2:
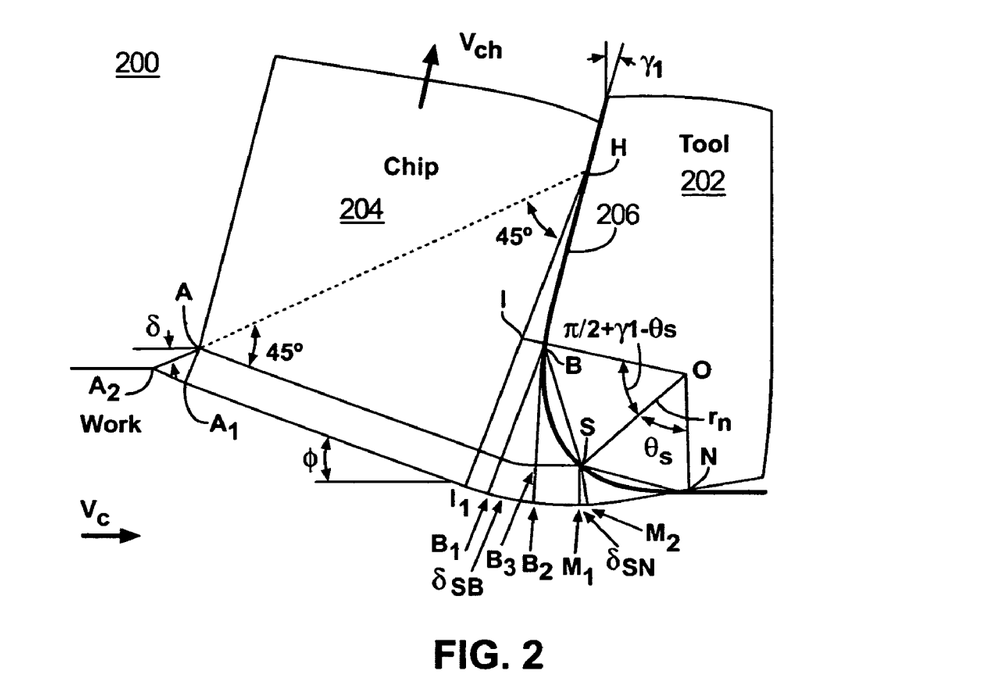
FIG. 2 is a cross-sectional diagram illustrating a slip-line model of a tool and workpiece.

FIG. 2 illustrates a slip-line model 200 for machining that includes a tool 202 and a chip 204. The model 200 assumes that there is continuous chip formation with no built-up edge and straight chip formation. The size of the shear zones is exaggerated to clearly show slip-lines. The rounded cutting edge BN is approximately represented by two straight chords SB and SN. This follows a methodology that replaces a curved frictional boundary with one or multiple straight chords to simplify the mathematical formulation of the slip-line problem. Point S is the stagnation point of material flow. Part of the material flows upward from point S to B, while the other part flows downward from point S to N.

In FIG. 2, $V_c$ is the cutting speed; $V_{ch}$ is the chip speed; $\gamma_1$ is the tool rake angle; $\delta$ is the angle between the straight boundary $AA_2$ and $V_c$; $\phi$ is the "shear-plane" angle; $r_n$ is the tool edge radius; $\theta_s$ is the angle determining the position of the stagnation point S; and $\delta_{SB}$ and $\delta_{SN}$ are two slip-line angles. Each slip-line sub-region shown in FIG. 2 corresponds to a physical meaning. The triangular regions BHI, $BB_3S$, and $SM_2N$ are caused by tool-chip friction on the tool rake face 206, on the cutting edge SB, and on the cutting edge SN, respectively. The region $AA_1A_2$ provides the material "pre-flow" effect. The primary shear zone corresponds to the parallel-sided slip-line region that is directly associated with tool-chip friction below the stagnation point S on the rounded cutting edge. The model 200 includes the central fan region $BB_1B_2$ to enable the material to depart from the rounded edge tool 202 in a direction tangential to the tool surface.

Figure 3:
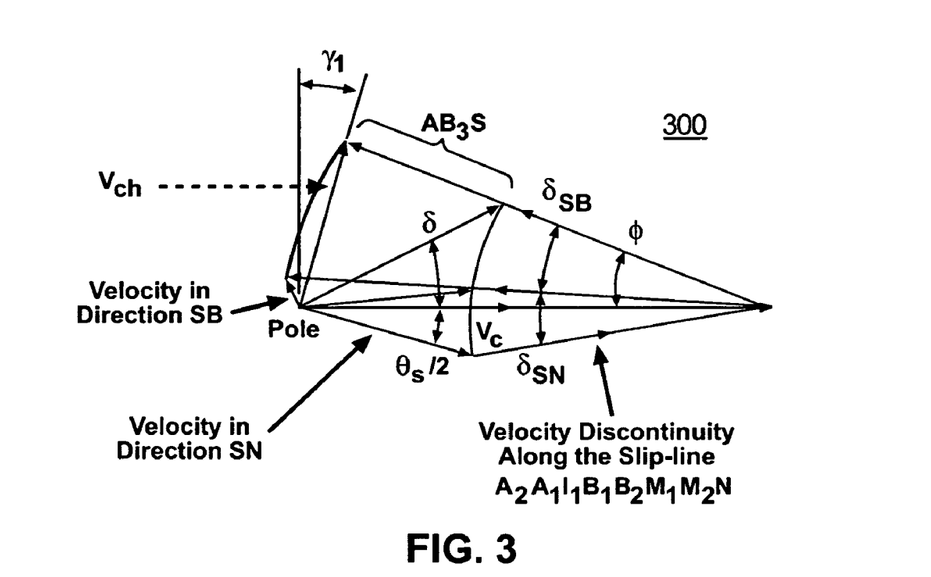
FIG. 3 is a hodograph associated with the cross-sectional diagram of FIG. 2.

FIG. 3 is a hodograph diagram 300 of the slip-line model 200. Velocity discontinuity is noted along slip-line $AB_3S$.

Figure 4:
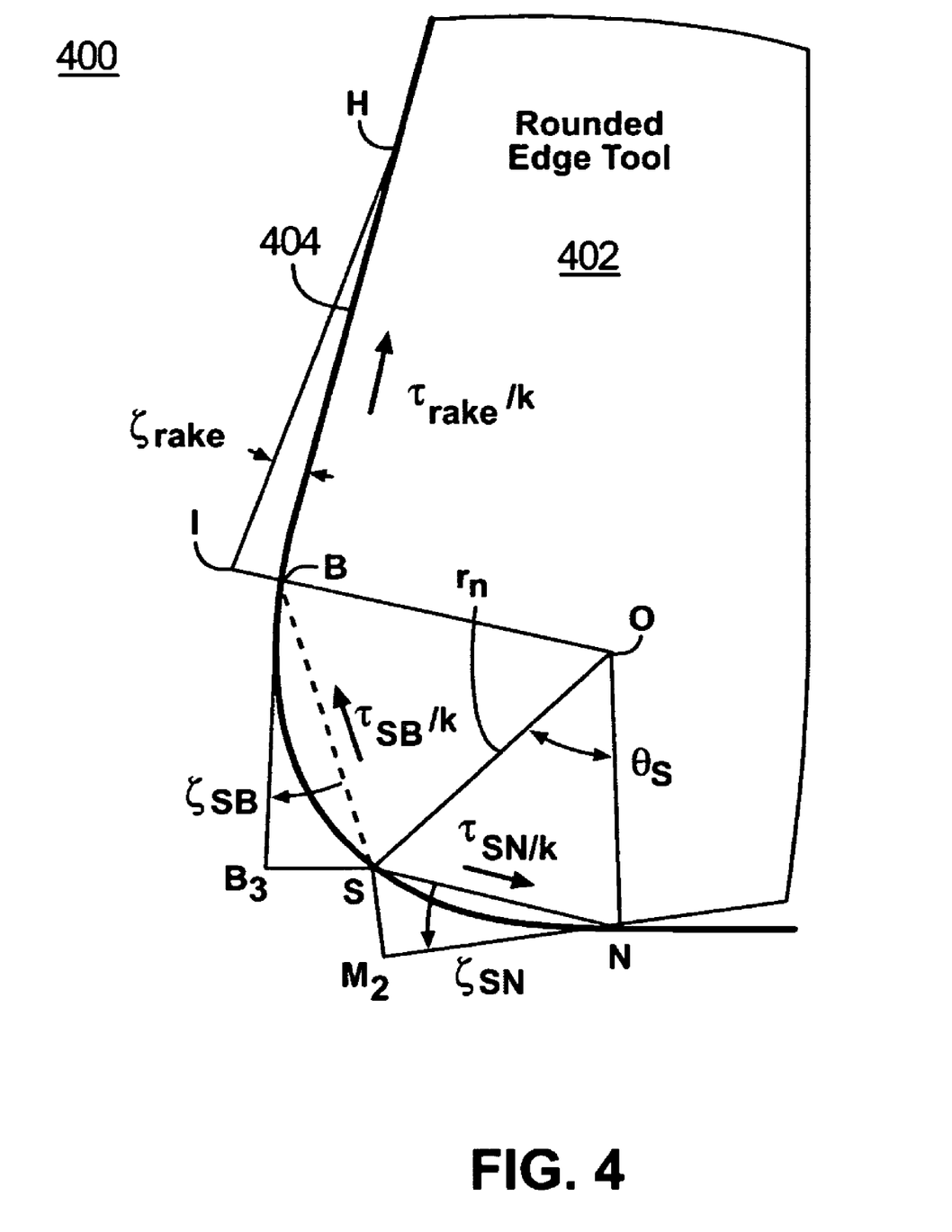
FIG. 4 is a cross-sectional view of a tool illustrating a slip-line model.

FIG. 4 is a model 400 illustrating a cutting tool 402. Four variables are used to define a rounded cutting edge: (1) tool edge radius $r_n$; (2) position $\theta_s$ of the stagnation point on the cutting edge; (3) tool-chip frictional shear stress $\tau_{SB}$ above the stagnation point on the cutting edge; and (4) tool-chip frictional shear stress $\tau_{SN}$ below the stagnation point. In FIG. 4, $\tau_{rake}$ is the tool-chip frictional shear stress on the tool rake face 404 and k is the average material shear flow stress.

With reference to FIGS. 2 and 4, angles $\zeta_{SB}$, $\zeta_{SN}$, and $\zeta_{rake}$ are determined by $$\zeta_{SB}=[\cos^{-1}(\tau_{SB}/k)]/2 \tag{1}$$

$$\zeta_{SN}=[\cos^{-1}(\tau_{SN}/k)]/2 \tag{2}$$

$$\zeta_{rake}=[\cos^{-1}(\tau_{rake}/k)]/2 \tag{3}$$

The chip thickness $h_{ch}$ is calculated as $$h_{ch}=\sqrt{2}\cdot\cos(\pi/4-\zeta_{rake})\cdot(BH\cdot\cos\zeta_{rake}+SB\cdot\cos\zeta_{SB}) \tag{4}$$

where, $$SB = 2\cdot r_n \cdot \sin\left(\frac{\pi}{4} + \frac{\gamma_1}{2} - \frac{\theta_s}{2}\right); \tag{5}$$

$$BH = \frac{h_c + \sqrt{2}\cdot(\Delta S + SB\cdot\cos\zeta_{SB})\cdot\sin\delta - r_n\cdot(1+\sin\gamma_1)}{(\cos\zeta_{rake} + \sin\zeta_{rake})\cdot\sin(\gamma_1 + \zeta_{rake})}; \tag{6}$$

$$\delta = \pi/4 - \gamma_1 - \zeta_{rake}; \tag{7}$$

$$\Delta S = \sqrt{2}\cdot r_n \cdot \sqrt{1 - \frac{\tau_{SN}}{k}} \cdot \sin\left(\frac{\theta_s}{2}\right). \tag{8}$$

If the forces across $A_2A_1I_1B_1$, $B_1B_2$, $B_2M_1$, $M_1M_2$, $M_2N$ are denoted by $\vec{F}_1$, $\vec{F}_2$, $\vec{F}_3$, $\vec{F}_4$, and $\vec{F}_5$, then the resultant force $\vec{F}$ is:

$$\frac{\vec{F}}{kh_cw} = \frac{\vec{F}_1}{kh_cw} + \frac{\vec{F}_2}{kh_cw} + \frac{\vec{F}_3}{kh_cw} + \frac{\vec{F}_4}{kh_cw} + \frac{\vec{F}_5}{kh_cw} \tag{9}$$

where w is the width of cut. The dimensionless cutting force $F_c/kh_cw$ and thrust force $F_t/kh_cw$ are determined by decomposing $F/kh_cw$ in directions parallel and normal to $V_c$.

The material flow in the primary shear zone is far more clearly defined than that along the tool-chip interface. Hence, the effort was focused in the primary shear zone. The average shear strain γ in this zone is calculated as:

$$\gamma = \frac{\cos\gamma_1}{2\cdot\sin\phi\cdot\cos(\phi-\gamma_1)} \tag{10}$$

where $$\phi=\gamma_1+\zeta_{rake} \tag{11}$$

The total velocity discontinuity $V_s$ for material to pass through the primary shear zone is given by:

$$V_s = \frac{\cos\gamma_1}{\cos(\phi-\gamma_1)}\cdot V_c \tag{12}$$

The average shear strain-rate $\dot{\gamma}$ in the primary shear zone is then calculated as:

$$\dot{\gamma}_{ave}=V_s/\Delta S \tag{13}$$

The average temperature T in the primary shear zone is given as:

$$T = T_W + \eta\cdot\left[\frac{1-\beta}{\rho_s S}\cdot\frac{k\cdot\cos\gamma_1}{\sin\phi\cdot\cos(\phi-\gamma_1)}\right] \tag{14}$$

where $T_w$ is the initial work temperature, η is a heat transfer-related constant, $\rho_s$ is the material density, S is the specific heat, and β is a parameter determined by the specific heat and the thermal conductivity. Table 1 shows the inputs and outputs of a model established above in Eqs. (1)-(14).

The goal is to determine a set of data combinations for k, γ, $\dot{\gamma}$, and T. The flow stress k can be known from $F_c/kh_cw$ calculated from Eq. (9) and $F_c$ measured from a cutting test. In Table 1, most of inputs including tool geometry, cutting conditions, and the physical and thermal properties of work material can be known from given data.

TABLE 1

| | INPUTS AND OUTPUTS OF THE MODEL ESTABLISHED AS EQS. (1)–(14). | |
|---|---|---|
| Inputs | Tool geometry | Tool edge radius $r_n$ |
| | | Tool rake angle $\gamma_1$ |
| | Cutting conditions | Cutting speed $V_c$ |
| | | Undeformed chip thickness $h_c$ |
| | | Width of cut w |
| | Work material physical and thermal properties | Density $\rho_s$ |
| | | Thermal conductivity K |
| | | Specific heat S |
| | | Initial temperature $T_w$ |
| | Tool-chip friction | On the tool rake face $\tau_{rake}/k$ |
| | | On the tool edge SB $\tau_{SB}/k$ |
| | | On the tool edge SN $\tau_{SN}/k$ |
| | Position of stagnation point | $\theta_s$ |
| Outputs | Chip thickness | $h_{ch}$, by Eq. (4) |
| | Force ratio | $F_c/F_t$, by Eq. (9) |
| | Dimensionless forces | $F_c/kh_cw$ and $F_t/kh_cw$, by Eq. (9) |
| | Strain | γ, by Eq. (10) |
| | Strain-rate | $\dot{\gamma}$, by Eq. (13) |
| | Temperature | T, by Eq. (14) |

The unknown inputs are tool-chip friction ($\tau_{rake}/k$, $\tau_{SB}/k$, and $\tau_{SN}/k$) and the position $\theta_s$ of the stagnation point. The remaining inputs $r_n$, $\gamma_1$, $V_c$, $h_c$, w, $\rho_s$, K, S, $T_w$ are known inputs. $V_c$, $h_c$, and w are determined based on operator setup of the cutting tool. A reverse method is used to determine tool-chip friction and $\theta_s$ by matching the predicted and experimental force ratio ($F_c/F_t$) and chip thickness ($h_{ch}$). Tool-chip friction is assumed to be uniform, i.e., $\tau_{rake}/k=\tau_{SB}/k=\tau_{SN}/k$. In the reverse method, the force ratio $F_c/F_t$ and the chip thickness $h_{ch}$ are experimentally measured. Next, an initial estimate for tool-chip friction and $\theta_s$ (i.e., $\tau_{rake}/k=0.5$ and $\theta_s=10°$) is made. For accuracy, $\theta_s$ should be less than 20°. As $\theta_s$ becomes equal to or greater than 20° due to tool wear, the results will not be as accurate. A non-linear computation algorithm incorporating Eqs. (1)-(14) runs to determine a specific combination of $\tau_{rake}/k$ and $\theta_s$ that satisfies the following condition:

$$\left[\left(\frac{F_c}{F_t}\right)_{pr} - \left(\frac{F_c}{F_t}\right)_{ex}\right]^2 + \left[\left(\frac{h_{ch}}{h_c}\right)_{pr} - \left(\frac{h_{ch}}{h_c}\right)_{ex}\right]^2 \le 10^{-12}, \quad (15)$$

where the subscripts "pr" and "ex" stand for the predicted and experimental values. Once tool-chip friction $\tau_{rake}$ and $\theta_s$ are determined, strains, strain-rates, temperatures, and stresses are all calculated using the same Eqs. (1)-(14).

The number of machining tests needed to perform depends on the mathematical form of material constitutive model to be adopted and on the requirement for accuracy. In addition, it is recommended to include a wide range of cutting conditions in tests, so the established material constitutive model is more versatile.

A total of 108 orthogonal tube-cutting tests were conducted on a CNC turning center (HAAS SL-10) in the Machining Research Laboratory at Utah State University. The 108 cutting tests involved three materials (6061-T6, 2024-T351, and 7075-T6 aluminum alloys), three cutting speeds, and 12 feed rates. The material density is 2712.64, 2768.0, and 2795.68 kg/m³, respectively. The data from Military Handbook (1998) was used to establish the relationships between the specific heat S (JKg⁻¹K⁻¹), the thermal conductivity K (Wm⁻¹K⁻¹), and the temperature T (° C.) as follows:

For AL-6061-T6:

$$S(T)=4.96224\times10^{-14}T^6-3.74891\times10^{-11}T^5-8.52635\times10^{-9}T^4+1.48883\times10^{-5}T^3-5.08\times10^{-3}T^2+1.17447T+856.20635 \quad (16)$$

$$K(T)=-1.60552\times10^{-14}T^6+2.00589\times10^{-11}T^5-7.92838\times10^{-9}T^4+7.77749\times10^{-7}T^3-1.41869\times10^{-4}T^2+0.16685T+147.19982 \quad (17)$$

For AL-2024-T351:

$$S(T)=-1.78389\times10^{-13}T^6+1.6225\times10^{-10}T^5-3.59302\times10^{-8}T^4+3.25646\times10^{-6}T^3-2.69\times10^{-3}T^2+1.12107T+862.38178 \quad (18)$$

$$K(T)=5.55104\times10^{-15}T^6+5.77525\times10^{-12}T^5-9.30259\times10^{-9}T^4+1.56712\times10^{-6}T^3+2.84875\times10^{-4}T^2+0.187 \quad (19)$$

For AL-7075-T6:

$$S(T)=-2.0\times10^{-4}T^2+0.8764T+833.2 \quad (20)$$

$$K(T)=-3.0\times10^{-4}T^2+0.1511T+128.18 \quad (21)$$

The applicable ranges of temperatures for Eqs. (16-17) and Eqs. (18-21) are 0° C.-540° C. and 0° C.-450° C., respectively. Flat-faced tool inserts TPG432 KC8050 made of sintered carbide with a TiC/TiN/TiCN coating on tool surface are employed. The tool insert has a working rake angle of 5 degrees. The tool edge radius $r_n$ is measured by using a Mitutoyo type SV602 fine contour measuring instrument. The portion of the tool edge that had the most uniform distribution of $r_n$ (58 μm) is employed in the cutting tests. To avoid built-up edge and rapid tool-wear, the cutting speed varies at 200, 350, and 500 m/min. The feed rate changed from 63.8 to 223.3 μm/rev. The width of cut was 3.0 mm.

The cutting forces $F_c$ and $F_t$ are measured by employing a force measurement system including a Kistler type 9257B piezo-electric three-component dynamometer, a Kistler type 5814B1 multichannel charge amplifier, and a computer data acquisition system (Labview). The measurement system frequency is much higher (far more than two times) than the frequency of the cutting forces. After the force signals are collected from the dynamometer, MATLAB is employed to filter the high-frequency noise signal. The chip thickness $h_{ch}$ is measured using three chip samples generated under the same cutting conditions. The average value from these chip samples is taken as the experimental $h_{ch}$.

The von Mises material flow criterion is employed to relate the shear flow stress k, the shear strain γ, and the shear strain-rate $\dot{\gamma}$ to the effective stress σ, the effective strain ε, and the effective strain-rate $\dot{\epsilon}$ as follows:

$$k=\sqrt{1/3}\cdot\sigma \quad (22)$$

$$\epsilon=\sqrt{1/3}\cdot\gamma \quad (23)$$

$$\dot{\epsilon}=\sqrt{1/3}\cdot\dot{\gamma} \quad (24).$$

The equation below shows the mathematical form of an alternative model:

$$\sigma=[A+B\cdot\epsilon^n][1+C\cdot\ln\dot{\epsilon}^*][1-T^{*m}] \quad (25)$$

where A, B, n, C, and m are five constitutive constants given in Table 2; $\dot{\epsilon}^*$ is the dimensionless strain-rate; and T* is the homologous temperature.

TABLE 2

FIVE CONSTITUTIVE CONSTANTS

| Materials | A | B | n | C | m |
|---|---|---|---|---|---|
| 6061-T6 | 324 | 114 | 0.42 | 0.002 | 1.34 |
| 2024-T351 | 265 | 426 | 0.34 | 0.015 | 1.00 |
| 7075-T6 | 496 | 310 | 0.30 | 0.0 | 1.20 |

The five constants given in Table 2 are obtained from torsion, static tensile, dynamic Hopkinson bar tensile, or ballistic impact tests. For example, the material constants for AL-7075-T6 were obtained through ballistic impact tests with the impact velocities ranging from 270 to 370 m/s and strains ranging from 0 to 1.0. These constants are valid within the conditions under which their original tests were conducted. The constants for AL-6061-T6 and AL-7075-T6, given in Table 2, can still be employed for machining applications due to small prediction errors. However, relatively large prediction errors exist for AL-2024-T351. Hence, those constants for AL-2024-T351 listed in Table 2 need to be modified for machining applications, if higher accuracy of predictions is preferred or required. A set of modified constants for AL-2024-T351 are given as: A=420 MPa, B=200 MPa, n=0.025, C=0.015, m=1.00. With these modified constants, the average difference $D_a$ reduces to 7.3%, 6.9%, and 7.2% at the cutting speeds of 200, 350, and 500 m/min, respectively.

A new methodology for modeling material constitutive behavior through an orthogonal machining test is disclosed herein. The methodology has the advantage of being directly applicable to the deformation conditions of large strains, high strain-rates, and high temperatures. The methodology can also be employed to examine the applicability of existing material constitutive models. The methodology is efficient and convenient, compared to commonly employed techniques for testing material stress-strain relationships. A new slip-line model takes into effect the tool edge roundness on strain-rates. A reverse methodology determines tool-chip friction and the position of a stagnation point.

The methodology applies to metal and metal alloys, which experience plastic deformation in machining. The methodology also applies to metal matrix composites materials that experience plastic deformation in machining. Metal matrix composites are widely applied in modern industries, such as aerospace, aircraft, automotive, sports, machine tool manufacturing, and the like. Examples of metal matrix materials include aluminum matrix composites, magnesium matrix composites, titanium matrix composites, copper matrix composites, superalloy matrices composites, and metal-matrix composites in various laminated forms. When applying the methodology to materials, tool wear must be avoided during cutting tests to ensure accuracy.

While specific embodiments and applications have been illustrated and described, it is to be understood that the invention is not limited to the precise configuration and components disclosed herein. Various modifications, changes, and variations apparent to those of skill in the art may be made in the arrangement, operation, and details of the methods and systems of the present invention disclosed herein without departing from the spirit and scope of the present invention.

What is claimed is:

1. A method for calculating a tool chip friction, $\tau_{rake}$, and a position of stagnation, $\theta_s$, for a cutting tool, comprising:
   measuring a ratio of cutting force, $F_c$, to thrust force, $F_t$;
   measuring a chip thickness, $h_{ch}$, produced by applying the cutting tool to a material;
   estimating initial values for the tool chip friction, $\tau_{rake}$, and position of stagnation, $\theta_s$;
   calculating the tool chip friction, $\tau_{rake}$, and the position of stagnation, $\theta_s$, to satisfy, $$\left[\left(\frac{F_c}{F_t}\right)_{pr} - \left(\frac{F_c}{F_t}\right)_{ex}\right]^2 + \left[\left(\frac{h_{ch}}{h_c}\right)_{pr} - \left(\frac{h_{ch}}{h_c}\right)_{ex}\right]^2 \le 10^{-12};$$

and
   applying the calculated tool chip friction, $\tau_{rake}$, and the calculated position of stagnation, $\theta_s$, to a model of constitutive behavior for the material.

2. The method of claim 1, wherein calculating the tool chip friction, $\tau_{rake}$, and the position of stagnation, $\theta_s$, includes calculating $h_{ch}$ from, $$h_{ch} = \sqrt{2} \cdot \cos\left(\frac{\pi}{4} - \zeta_{rake}\right) \cdot (BH \cdot \cos\zeta_{rake} + SB \cdot \cos\zeta_{SB}).$$

3. The method of claim 2, wherein calculating $h_{ch}$ includes calculating SB from, $$SB = 2 \cdot r_n \cdot \sin\left(\frac{\pi}{4} + \frac{\gamma_1}{2} - \frac{\theta_s}{2}\right).$$

4. The method of claim 2, wherein calculating $h_{ch}$ includes calculating BH from, $$BH = \frac{h_c + \sqrt{2} \cdot (\Delta S + SB \cdot \cos\zeta_{SB}) \cdot \sin\delta - r_n \cdot (1 + \sin\gamma_1)}{(\cos\zeta_{rake} + \sin\zeta_{rake}) \cdot \sin(\gamma_1 + \zeta_{rake})}.$$

5. The method of claim 2, wherein calculating $h_{ch}$ includes calculating $\delta$ from, $$\delta = \pi/4 - \gamma_1 - \zeta_{rake}.$$

6. The method of claim 2, wherein calculating $h_{ch}$ includes calculating $\Delta S$ from, $$\Delta S = \sqrt{2} \cdot r_n \cdot \sqrt{1 - \frac{\tau_{SN}}{k}} \cdot \sin\left(\frac{\theta_s}{2}\right).$$

7. The method of claim 1, wherein the material includes a metal composite material to experience plastic deformation in machining.

8. A method for calculating a material shear strain, $\gamma$, of a material, comprising:
   determining a tool chip friction, $\tau_{rake}$, for a cutting tool;
   determining a rake slip-line angle, $\zeta_{rake}$, based on the tool chip friction, $\tau_{rake}$;
   determining a shear plane angle, $\phi$, based on the rake slip-line angle, $\zeta_{rake}$, and a tool rake angle, $\gamma_1$;
   determining the shear strain, $\gamma$, based on the tool rake angle, $\gamma_1$, and shear plane angle, $\phi$; and
   applying the shear strain, $\gamma$, to a material constitutive model.

9. The method of claim 8, wherein determining a tool chip friction, $\tau_{rake}$, includes,
   measuring a ratio of cutting force, $F_c$, to thrust force, $F_t$;
   measuring a chip thickness, $h_{ch}$, produced by applying the cutting tool to the material;
   estimating initial values for the tool chip friction, $\tau_{rake}$, and a position of stagnation, $\theta_s$; and
   determining the tool chip friction, $\tau_{rake}$, and the position of stagnation, $\theta_s$, that satisfies, $$\left[\left(\frac{F_c}{F_t}\right)_{pr} - \left(\frac{F_c}{F_t}\right)_{ex}\right]^2 + \left[\left(\frac{h_{ch}}{h_c}\right)_{pr} - \left(\frac{h_{ch}}{h_c}\right)_{ex}\right]^2 \le 10^{-12}.$$

10. The method of claim 9, wherein determining the tool chip friction, $\tau_{rake}$, and the position of stagnation, $\theta_s$, includes calculating $h_{ch}$ from, $$h_{ch} = \sqrt{2} \cdot \cos(\pi/4 - \zeta_{rake}) \cdot (BH \cdot \cos\zeta_{rake} + SB \cdot \cos\zeta_{SB}).$$

11. The method of claim 10, wherein calculating $h_{ch}$ includes calculating SB from, $$SB = 2 \cdot r_n \cdot \sin\left(\frac{\pi}{4} + \frac{\gamma_1}{2} - \frac{\theta_s}{2}\right).$$

12. The method of claim 10, wherein calculating $h_{ch}$ includes calculating BH from, $$BH = \frac{h_c + \sqrt{2} \cdot (\Delta S + SB \cdot \cos\zeta_{SB}) \cdot \sin\delta - r_n \cdot (1 + \sin\gamma_1)}{(\cos\zeta_{rake} + \sin\zeta_{rake}) \cdot \sin(\gamma_1 + \zeta_{rake})}.$$

13. The method of claim 10, wherein calculating $h_{ch}$ includes calculating $\delta$ from, $$\delta = \pi/4 - \gamma_1 - \zeta_{rake}.$$

14. The method of claim 10, wherein calculating $h_{ch}$ includes calculating $\Delta S$ from, $$\Delta S = \sqrt{2} \cdot r_n \cdot \sqrt{1 - \frac{\tau_{SN}}{k}} \cdot \sin\left(\frac{\theta_s}{2}\right).$$

15. The method of claim 8, wherein determining a rake slip-line angle, $\zeta_{rake}$, includes calculating, $\zeta_{rake} = [\cos^{-1}(\tau_{rake}/k)]/2$.

16. The method of claim 8, wherein determining a shear plane angle, $\phi$, includes calculating, $\phi = \zeta_{rake} + \gamma_1$.

17. The method of claim 8 wherein determining the shear strain, $\gamma$, includes calculating, $$\gamma = \frac{\cos\gamma_1}{2 \cdot \sin\phi \cdot \cos(\phi - \gamma_1)}.$$

18. The method of claim 8, wherein the material includes a metal composite material to experience plastic deformation in machining.

19. A method for calculating an average strain-rate $\dot{\gamma}$ in a primary shear zone for a material by applying a cutting tool to the material, comprising:
   determining a tool chip friction, $\tau_{rake}$, and a position of stagnation, $\theta_s$, for the cutting tool;
   determining a rake slip-line angle, $\zeta_{rake}$, based on the tool chip friction, $\tau_{rake}$;
   determining a shear plane angle, $\phi$, based on the rake slip-line angle, $\zeta_{rake}$, and a tool rake angle, $\gamma_1$;
   determining a total velocity discontinuity, $V_s$, based on a tool rake angle, $\gamma_1$, a cutting speed, $V_c$, and the shear plane angle, $\phi$;
   determining a primary shear zone thickness $\Delta S$ based on $\theta_s$;
   determining an average strain-rate, $\dot{\gamma}$, based on the total velocity discontinuity $V_s$, and the primary shear zone thickness $\Delta S$; and
   applying the average strain-rate, $\dot{\gamma}$, to a material constitutive model.

20. The method of claim 19, wherein determining the tool chip friction, $\tau_{rake}$, and the position of stagnation, $\theta_s$, includes,
   measuring a ratio of cutting force, $F_c$, to thrust force, $F_t$;
   measuring a chip thickness, $h_{ch}$, produced by applying the cutting tool to the material;
   estimating initial values for the tool chip friction, $\tau_{rake}$, and the position of stagnation, $\theta_s$; and
   determining a combination of the tool chip friction, $\tau_{rake}$, and the position of stagnation, $\theta_s$, that satisfies, $$\left[\left(\frac{F_c}{F_t}\right)_{pr} - \left(\frac{F_c}{F_t}\right)_{ex}\right]^2 + \left[\left(\frac{h_{ch}}{h_c}\right)_{pr} - \left(\frac{h_{ch}}{h_c}\right)_{ex}\right]^2 \le 10^{-12}.$$

21. The method of claim 20, wherein determining the tool chip friction, $\tau_{rake}$, and the position of stagnation, $\theta_s$, includes calculating $h_{ch}$ from, $$h_{ch} = \sqrt{2} \cdot \cos\left(\frac{\pi}{4} - \zeta_{rake}\right) \cdot (BH \cdot \cos\zeta_{rake} + SB \cdot \cos\zeta_{SB}).$$

22. The method of claim 21, wherein calculating $h_{ch}$ includes calculating SB from, $$SB = 2 \cdot r_n \cdot \sin\left(\frac{\pi}{4} + \frac{\gamma_1}{2} - \frac{\theta_s}{2}\right).$$

23. The method of claim 21, wherein calculating $h_{ch}$ includes calculating BH from, $$BH = \frac{h_c + \sqrt{2} \cdot (\Delta S + SB \cdot \cos\zeta_{SB}) \cdot \sin\delta - r_n \cdot (1 + \sin\gamma_1)}{(\cos\zeta_{rake} + \sin\zeta_{rake}) \cdot \sin(\gamma_1 + \zeta_{rake})}.$$

24. The method of claim 21, wherein calculating $h_{ch}$ includes calculating $\delta$ from, $\delta = \pi/4 - \gamma_1 - \zeta_{rake}$.

25. The method of claim 21, wherein calculating $h_{ch}$ includes calculating $\Delta S$ from, $$\Delta S = \sqrt{2} \cdot r_n \cdot \sqrt{1 - \frac{\tau_{SN}}{k}} \cdot \sin\left(\frac{\theta_s}{2}\right).$$

26. The method of claim 19, wherein determining a rake slip-line angle, $\zeta_{rake}$, includes calculating, $\zeta_{rake} = [\cos^{-1}(\tau_{rake}/k)]/2$.

27. The method of claim 19, wherein determining a shear plane angle, $\phi$, includes calculating, $\phi = \zeta_{rake} + \gamma_1$.

28. The method of claim 19, wherein determining a total velocity discontinuity, $V_s$, includes calculating, $$V_s = \frac{\cos\gamma_1}{\cos(\phi - \gamma_1)} \cdot V_c.$$

29. The method of claim 19, wherein determining a primary shear zone thickness, $\Delta S$, includes calculating, $$\Delta S = \sqrt{2} \cdot r_n \cdot \sqrt{1 - \frac{\tau_{SN}}{k}} \cdot \sin\left(\frac{\theta_s}{2}\right).$$

30. The method of claim 19, wherein determining an average strain-rate, $\dot{\gamma}$, includes calculating, $$\dot{\gamma}_{ave} = \frac{V_s}{\Delta S}.$$

31. The method of claim 19, wherein the material includes a metal composite material to experience plastic deformation in machining.

32. A method for calculating an average temperature, T, of a material in a primary shear zone when applying a cutting tool to the material, comprising:
   determining a tool chip friction, $\tau_{rake}$, and a position of stagnation, $\theta_s$, for the cutting tool;
   determining a rake slip-line angle, $\zeta_{rake}$, based on the tool chip friction, $\tau_{rake}$;
   determining a shear plane angle, $\phi$, based on the rake slip-line angle, $\zeta_{rake}$, and a tool rake angle, $\gamma_1$;
   determining the average temperature, T, based on initial temperature, $T_w$, density $\rho_s$, specific heat S, tool rake angle, $\gamma_1$, shear plane angle, $\phi$, and average material flow stress k; and
   applying the average temperature, T, of the material in the primary shear zone to a material constitutive model.

33. The method of claim 32, wherein determining the tool chip friction, $\tau_{rake}$, and the position of stagnation, $\theta_s$, includes, measuring a ratio of cutting force, $F_c$, to thrust force, $F_t$;

measuring a chip thickness, $h_{ch}$, produced by applying the cutting tool to the material;

estimating initial values for the tool chip friction, $\tau_{rake}$, and the position of stagnation, $\theta_s$; and determining a combination of the tool chip friction, $\tau_{rake}$, and the position of stagnation, $\theta_s$, that satisfies, $$\left[\left(\frac{F_c}{F_t}\right)_{pr} - \left(\frac{F_c}{F_t}\right)_{ex}\right]^2 + \left[\left(\frac{h_{ch}}{h_c}\right)_{pr} - \left(\frac{h_{ch}}{h_c}\right)_{ex}\right]^2 \leq 10^{-12}.$$

34. The method of claim 33, wherein determining the tool chip friction, $\tau_{rake}$, and the position of stagnation, $\theta_s$, includes calculating $h_{ch}$ from, $$h_{ch} = \sqrt{2} \cdot \cos\left(\frac{\pi}{4} - \zeta_{rake}\right) \cdot (BH \cdot \cos\zeta_{rake} + SB \cdot \cos\zeta_{SB}).$$

35. The method of claim 34, wherein calculating $h_{ch}$ includes calculating SB from, $$SB = 2 \cdot r_n \cdot \sin\left(\frac{\pi}{4} + \frac{\gamma_1}{2} - \frac{\theta_s}{2}\right).$$

36. The method of claim 34, wherein calculating $h_{ch}$ includes calculating BH from, $$BH = \frac{h_c + \sqrt{2} \cdot (\Delta S + SB \cdot \cos\zeta_{SB}) \cdot \sin\delta - r_n \cdot (1 + \sin\gamma_1)}{(\cos\zeta_{rake} + \sin\zeta_{rake}) \cdot \sin(\gamma_1 + \zeta_{rake})}.$$

37. The method of claim 34, wherein calculating $h_{ch}$ includes calculating $\delta$ from, $\delta = \pi/4 - \gamma_1 - \zeta_{rake}$.

38. The method of claim 34, wherein calculating $h_{ch}$ includes calculating $\Delta S$ from, $$\Delta S = \sqrt{2} \cdot r_n \cdot \sqrt{1 - \frac{\tau_{SN}}{k}} \cdot \sin\left(\frac{\theta_s}{2}\right).$$

39. The method of claim 32, wherein determining a rake slip-line angle, $\zeta_{rake}$, includes calculating, $\zeta_{rake} = [\cos^{-1}(\tau_{rake}/k)]/2$.

40. The method of claim 32, wherein determining a shear plane angle, $\phi$, includes calculating, $\phi = \zeta_{rake} + \gamma_1$.

41. The method of claim 32, wherein determining the average temperature, T, includes calculating, $$T = T_W + \eta \cdot \left[\frac{1-\beta}{\rho_s S} \cdot \frac{k \cdot \cos\gamma_1}{\sin\phi \cdot \cos(\phi - \gamma_1)}\right].$$

42. The method of claim 32, wherein the material includes a metal composite material to experience plastic deformation in machining.

43. A method for calculating a chip thickness, $h_{ch}$, produced by applying a cutting tool to a material, comprising:

determining a rake slip-line angle, $\zeta_{rake}$, based on tool chip friction, $\tau_{rake}$, for the cutting tool;

determining an edge slip-line angle, $\zeta_{SB}$, based on the tool chip friction, $\tau_{rake}$;

determining the chip thickness, $h_{ch}$, based on the rake slip-line angle, $\zeta_{rake}$, and the edge slip-line angle, $\zeta_{SB}$; and applying the calculated chip thickness, $h_{ch}$, to a material constitutive model.

44. The method of claim 43, wherein determining a tool chip friction, $\tau_{rake}$, includes, measuring a ratio of cutting force, $F_c$, to thrust force, $F_t$;

measuring a chip thickness, $h_{ch}$, produced by applying the cutting tool to the material;

estimating initial values for the tool chip friction, $\tau_{rake}$, and a position of stagnation, $\theta_s$; and determining a tool chip friction, $\tau_{rake}$, and position of stagnation, $\theta_s$, that satisfies, $$\left[\left(\frac{F_c}{F_t}\right)_{pr} - \left(\frac{F_c}{F_t}\right)_{ex}\right]^2 + \left[\left(\frac{h_{ch}}{h_c}\right)_{pr} - \left(\frac{h_{ch}}{h_c}\right)_{ex}\right]^2 \leq 10^{12}.$$

45. The method of claim 43, wherein determining the rake slip-line angle, $\zeta_{rake}$, includes calculating, $\zeta_{rake} = [\cos^{-1}(\tau_{rake}/k)]/2$.

46. The method of claim 43, wherein determining the edge slip-line angle, $\zeta_{SB}$, includes calculating, $\zeta_{SB} = [\cos^{-1}(\tau_{rake}/k)]/2$.

47. The method of claim 43, wherein determining the chip thickness, $h_{ch}$, includes calculating, $$h_{ch} = \sqrt{2} \cdot \cos\left(\frac{\pi}{4} - \zeta_{rake}\right) \cdot (BH \cdot \cos\zeta_{rake} + SB \cdot \cos\zeta_{SB}).$$

48. The method of claim 43, wherein the material includes a metal composite material to experience plastic deformation in machining.

49. A method for modeling material constitutive behavior, comprising:

providing a cutting tool having a curved edge;

applying the cutting tool to a material to remove one or more chips from the material;

measuring a ratio of cutting force, $F_c$, to thrust force, $F_t$, of the cutting tool as it is applied to the material;

measuring a chip thickness, $h_{ch}$, of the one or more chips produced by applying the cutting tool to the material;

calculating a tool chip friction, $\tau_{rake}$, and a position of stagnation, $\theta_s$, based on the measured ratio of cutting force, $F_c$, to thrust force, $F_t$, of the cutting tool and the chip thickness, $h_{ch}$; and providing the calculated tool chip friction, $\tau_{rake}$, and the position of stagnation, $\theta_s$, to a model of material constitutive behavior.

* * * * *

UNITED STATES PATENT AND TRADEMARK OFFICE
CERTIFICATE OF CORRECTION

| | |
|---|---|
| PATENT NO. | : 7,240,562 B2 |
| APPLICATION NO. | : 11/130851 |
| DATED | : July 10, 2007 |
| INVENTOR(S) | : Fang et al. |

It is certified that error appears in the above-identified patent and that said Letters Patent is hereby corrected as shown below:

Column 12, Line 25 reads:

$$\left[\left(\frac{F_c}{F_t}\right)_{pr} - \left(\frac{F_c}{F_t}\right)_{ex}\right]^2 + \left[\left(\frac{h_{ch}}{h_c}\right)_{pr} - \left(\frac{h_{ch}}{h_c}\right)_{ex}\right]^2 \leq 10^{12}$$

Which should read:

$$\left[\left(\frac{F_c}{F_t}\right)_{pr} - \left(\frac{F_c}{F_t}\right)_{ex}\right]^2 + \left[\left(\frac{h_{ch}}{h_c}\right)_{pr} - \left(\frac{h_{ch}}{h_c}\right)_{ex}\right]^2 \leq 10^{-12}$$

Signed and Sealed this

Twenty-ninth Day of July, 2008

JON W. DUDAS
*Director of the United States Patent and Trademark Office*